(12) United States Patent
Brill et al.

(10) Patent No.: US 6,568,697 B1
(45) Date of Patent: May 27, 2003

(54) INDEPENDENT STEERING AND ACTUATOR

(75) Inventors: Lawrence Brill, Westerville, OH (US); Malcolm Green, Granville, OH (US); Steven E. Hunter, Lancaster, OH (US); Duy Lam, Baltimore, OH (US); Ragnar Ledesma, Sterling Heights, MI (US); Mike Schuster, Rochester Hills, MI (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/023,261

(22) Filed: Dec. 13, 2001

(51) Int. Cl.$^7$ ................................................ B62D 7/99
(52) U.S. Cl. ............................ 280/93.512; 280/124.134
(58) Field of Search ................................. 180/400, 412, 180/443; 280/93.512, 124.134, 124.145, 124.157

(56) References Cited

U.S. PATENT DOCUMENTS 5,653,304 A * 8/1997 Renfroe ..................... 180/402

\* cited by examiner

*Primary Examiner*—Lesley D. Morris
*Assistant Examiner*—L. Lum
(74) *Attorney, Agent, or Firm*—Carlson, Gaskey & Olds

(57) ABSTRACT

A steering system for a vehicle is provided that includes a steering knuckle which is rotatable about an axis. The steering knuckle includes an upper attachment point and a lower attachment point. The attachment points define the steer axis. A rotational drive unit is connected to the steering knuckle for rotating the steering knuckle about the steer axis. A control module receives a steering input corresponding to the desired Ackerman angle and commands the rotational drive unit to rotate the steering knuckle about the axis to the desired Ackerman angle. Rotational drive units for each side of the vehicle ensure that the wheels are turned to the appropriate Ackerman angle for each wheel. The rotational drive unit may include an electric motor, or a pneumatic or hydraulic pump. In one preferred embodiment, the rotational drive unit includes a fluid housing and the shaft connected to the steering knuckle. The shaft includes a vane extending therefrom and into the housing. The fluid pump pumps fluid into the housing to rotate the vane with the shaft and steering knuckle about the axis in response to a command from the control module.

17 Claims, 2 Drawing Sheets

INDEPENDENT STEERING AND ACTUATOR

BACKGROUND OF THE INVENTION

This invention relates to steering systems for a vehicle, and more particularly, the invention relates to a steering system designed to address Ackerman errors.

Vehicle steering systems steer wheels on opposing sides of the vehicle in response to a steering input. Typically, an input from a steering wheel is directed through mechanical steering components to steer the wheels on each side. More specifically, the steering wheel is connected to a control box which is connected to one or more mechanical linkages connecting the opposing wheels. The mechanical linkages and control boxes are difficult to package in that they must be routed from one of the side to the other to mechanically connect the wheels.

During a vehicle turn, the inner wheels travel in a path having a smaller radius than the outer wheels. As a result, the inner wheel must be turned a greater amount than the outer wheel so that the wheels travel along their respective radial paths. Due to the limitations of the mechanical linkage provided by the steering system, the angle of the inner and outer wheels may not be changed independently from one another. The angles of the wheels during a turn is commonly referred to as the Ackerman angle. Accordingly, steering systems are designed so that the wheels are pointed in the direction of their respective radial paths for one particular turn, preferably in the range of 20° to 30°, such that there is no Ackerman error. For all other turning angles an Ackerman error exists such that at least one of the wheels is not pointed in the direction of its radial path. Ackerman error essentially causes the wheels to pull the vehicle in slightly different directions and accelerates tire wear. Therefore, what is needed is a steering system that eliminates Ackerman error for all of the vehicle turning angles to extend tire life.

SUMMARY OF THE INVENTION AND ADVANTAGES

The present invention provides a steering system for a vehicle that includes a steering knuckle which is rotatable about an axis. The steering knuckle includes upper and lower portions or attachment points that define the steer axis. A lower suspension interconnects the lower portion to the vehicle frame or body. An energy absorbing mechanism, preferably including an inner spring and a shock absorber, interconnects the upper portion to the vehicle body or frame. A rotational drive unit is connected to the steering knuckle for rotating the steering knuckle about the axis. A control module receives a steering input corresponding to the desired Ackerman angle and commands the rotational drive unit to rotate the steering knuckle about the axis to the desired Ackerman angle. Rotational drive units for each side of the vehicle ensure that the wheels are turned to the appropriate Ackerman angle for each wheel. The rotational drive unit may include an electric motor, or a pneumatic or hydraulic pump. In one preferred embodiment, the drive unit includes a rotary actuator which has a shaft connected rigidly to the steering knuckle. The actuator shaft may consist of either a single vane or multiple vanes. The fluid pump pumps fluid into the housing to rotate the vane with the shaft and steering knuckle about the axis in response to a command from the control module.

Accordingly, the above invention provides a steering system that eliminates Ackerman error for all of the vehicle turning angles and extends tire life.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
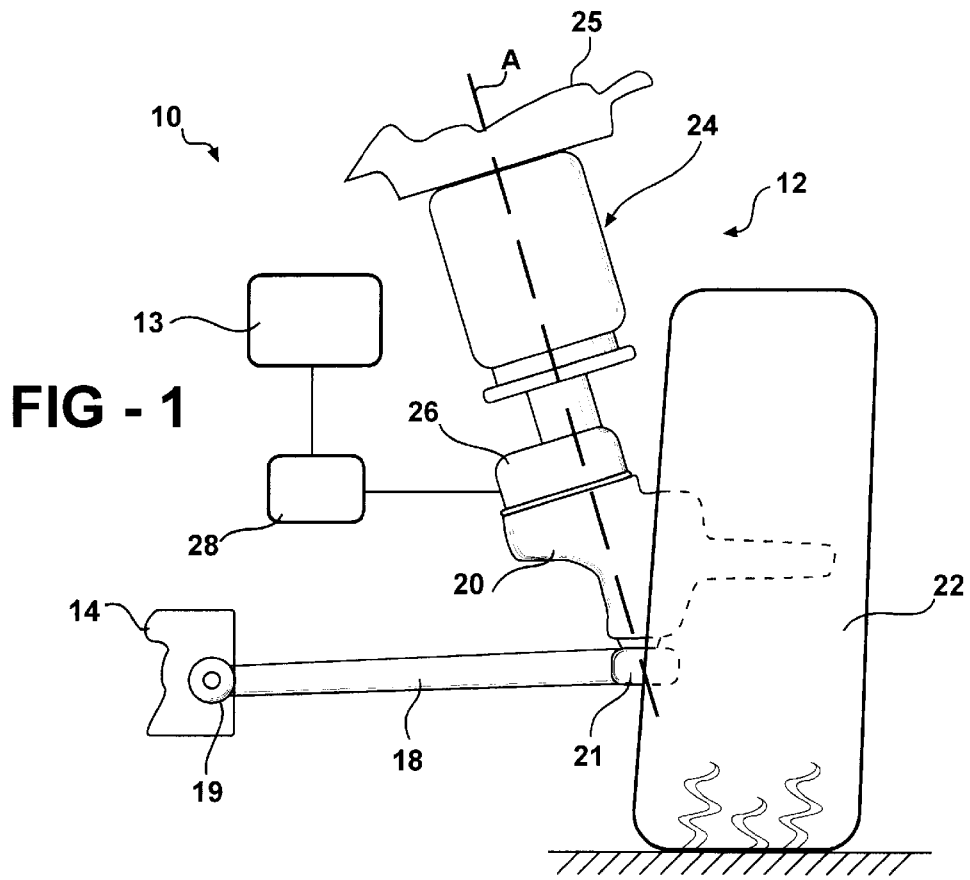
FIG. 1 is a schematic view of one embodiment of the present invention.

One embodiment of the present invention steering system 10 is shown in FIG. 1. The steering system 10 includes a steering assembly on a first side 12 and another steering assembly on the second side of the vehicle shown schematically at 13. The steering assembly 12 includes a structural member 14, such as a portion of a vehicle frame, supporting a lower suspension member 18, or A-arm at pivotal connection 19. A lower portion of a steering knuckle 20 is supported on the lower suspension arm 18 at a ball joint 21. The steering knuckle 20 includes a spindle supporting a wheel 22.

An energy absorber mechanism 24 is secured to a second structural member 25 and is connected an upper portion of the knuckle 20. The energy absorber mechanism 24 preferably includes an air spring and a shock absorber. The steering assembly arrangement shown in FIG. 1 is typically referred to as a MacPherson strut. Preferably the energy absorbing mechanism 24 is rotationally fixed relative to the second structural member 25 so that it does not rotate during a steering maneuver.

The steering knuckle 20 is rotatable about an axis A during steering maneuvers. A rotational drive unit 26 is connected to the steering knuckle 20 to rotate the knuckle in response to a steering input. For the embodiments shown in FIG. 1, preferably the rotational drive unit has a portion, such as a final drive gear, that is coaxial with axis A. The rotational drive unit 26 may be a suitable type of drive mechanism such as a pneumatic or hydraulic motor. For the embodiments shown in FIG. 1, it is preferable that the rotational drive unit 26 include an electric motor and gear reduction box.

A control module 28 is connected to the steering assemblies 12, 13 on each of the sides of the vehicle. Control module 28 receives a steering input corresponding to a desired Ackerman angle for each of the steering assemblies 12, 13. That is, each of the steering assemblies 12, 13 requires a different Ackerman angle during a vehicle turn so that each of the wheels is pointed in the direction of its path of travel. The control module 28 commands the rotational drive unit 26 to rotate the steering knuckle 20 about the axis A to achieve the desired Ackerman angle for each of the wheel assemblies 12, 13. In this manner, each of the steering assemblies 12, 13 are rotatable independently of one another so that the appropriate Ackerman angle for each wheel may be achieved.

Figure 2:
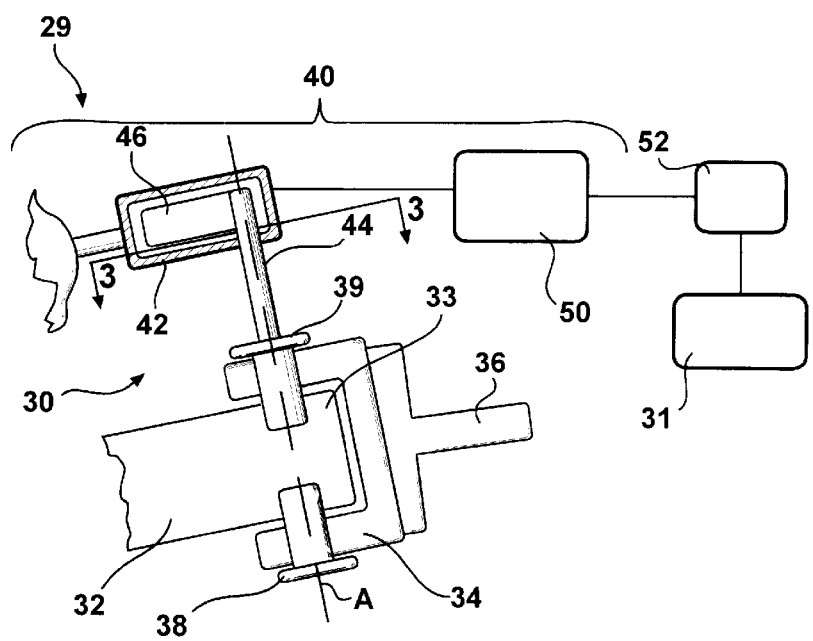
FIG. 2 is another embodiment of the steering system of the present invention.
Figure 3:
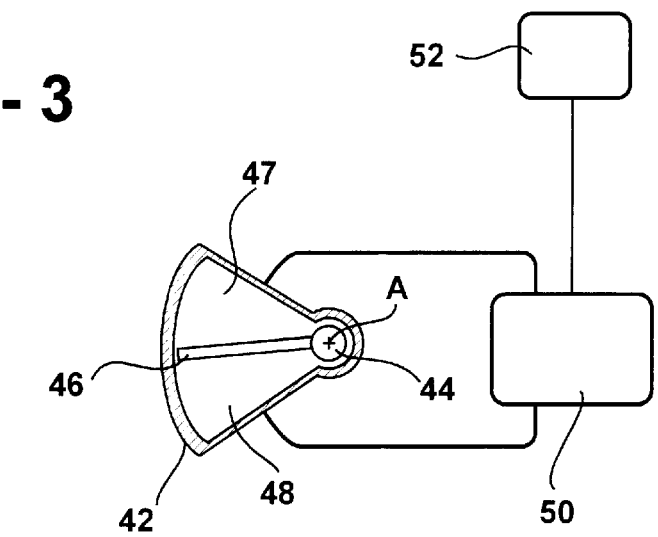
FIG. 3 is a cross-sectional view taken along lines 3—3 of FIG. 2.

Another steering system 29 of the present invention is shown in FIGS. 2 and 3. Similar to the steering system 10 shown in FIG. 1, the steering system 29 includes first 30 and second 31 steering assemblies movable independently from one another. The steering system 29 includes an axle 32 having an end 33. A knuckle 34 is supported on the end 33 and is secured thereto by king pins 38, 39. The knuckle 34 includes a spindle 36 for supporting a wheel (not shown). A rotational drive unit 40 is connected to the knuckle 34 for rotating the knuckle 34 about the axis A.

Figure 4:
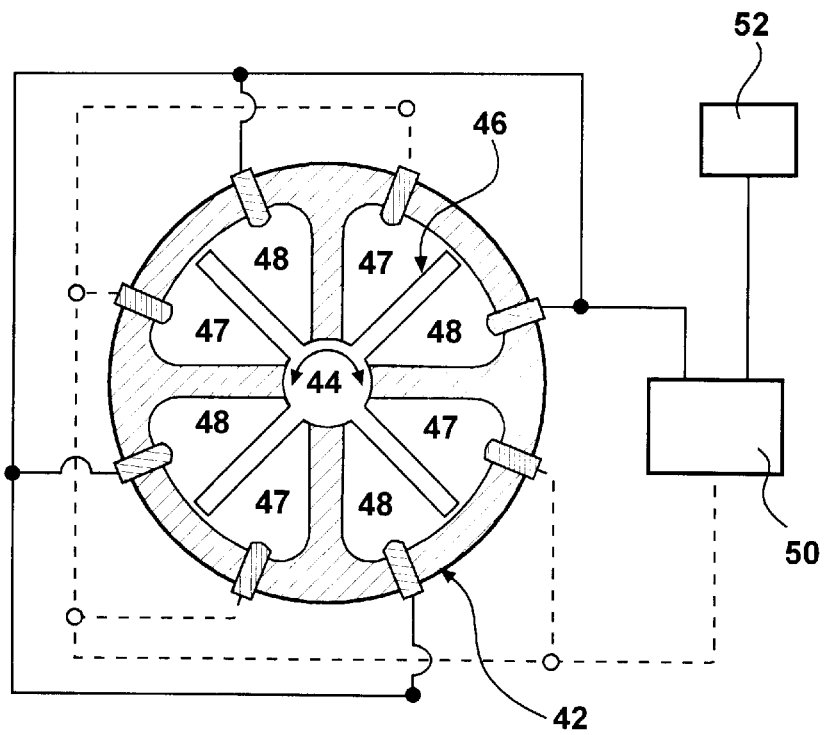
FIG. 4 is another embodiment of a fluid pump.

The rotational drive unit 40 includes a fluid housing 42. A shaft 44 extends from the king pin 39 and into the fluid housing 42. A vane 46 extends from the shaft 44 within the housing 42. As shown in FIG. 3, the vane 46 divides the housing 42 into first 47 and second 48 chambers. A fluid pump 50, such as a hydraulic or pneumatic pump, is connected to the housing 42. A fluid may be pumped by the fluid pump 50 into the first chamber 47 to move the vane 36 and shaft 44 in one direction, or the fluid pump 50 may pump fluid into the second chamber 48 to move the vane 36 and shaft 44 in the opposite direction. In this manner, the vane and shaft rotate the knuckle 34 about the axis A. This concept can be extended to multiple vane arrangement. As shown in FIG. 4, a round housing 42 may consist of four separate single vanes connected to shaft 44.

The control module 52 is connected to the fluid pump 50. Control module 52 receives a steering input corresponding to a desired Ackerman angle for each of the steering assemblies 30, 31. The control module 52 commands the rotational drive unit 40 to rotate the steering knuckle 34 about the axis A to the desired Ackerman angle for each of the steering assemblies 30, 31. In this manner, the steering assemblies 30, 31 rotate independently of one another to rotate the wheels to the appropriate Ackerman angle.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A steering system for a vehicle comprising:
   a steering knuckle pivotal about an axis and including upper and lower portions;
   a lower suspension member interconnecting said lower portion and a first structural member;
   an energy absorbing mechanism interconnecting said upper portion and a second structural member;
   a rotational drive unit connected to said steering knuckle for rotating said steering knuckle about said axis; and
   a control module receiving a steering input corresponding to a desired Ackerman angle and commanding said rotational drive unit to rotate said steering knuckle about said axis to said desired Ackerman angle.

2. The steering system according to claim 1, further including a second steering knuckle pivotal about an second axis and including second upper and lower portions, a second lower suspension member interconnecting said second lower portion and a third structural member, an second energy absorbing mechanism interconnecting said second upper portion and a fourth structural member, a second rotational drive unit connected to said second steering knuckle for rotating said second steering knuckle about said second axis, and said control module receiving said steering input corresponding to a second desired Ackerman angle different than said Ackerman angle and commanding said second rotational drive unit to rotate said second steering knuckle about said second axis to said second desired Ackerman angle.

3. The steering system according to claim 1, wherein said energy absorbing mechanism includes an air bag and a shock absorber.

4. The steering system according to claim 1, wherein a portion of said rotational drive unit is coaxial with said axis.

5. The steering system according to claim 1, wherein said rotational drive unit is an electric motor.

6. The steering system according to claim 1, wherein said energy absorbing mechanism is rotational fixed relative to said first structural member.

7. The steering system according to claim 1, wherein the rotational drive unit is disposed between said steering knuckle and said energy absorbing mechanism.

8. The steering system according to claim 1, wherein said rotation drive unit includes a reduction gear set.

9. A steering system for a vehicle comprising:
   a steering knuckle pivotal about an axis;
   a rotational drive unit including a fluid housing and a shaft connected to said steering knuckle coaxial with said axis and extending into said housing, said shaft including a vane extending radially there from, and said rotational drive unit including a fluid pump pumping fluid to said housing to rotate said vane with said shaft and steering knuckle about said axis; and
   a control module receiving a steering input corresponding to a desired Ackerman angle and commanding said rotational drive unit to rotate said steering knuckle about said axis to said desired Ackerman angle.

10. The steering system according to claim 9, further including an axle with said knuckle secured to an end of said axle by king pins, said shaft connected to one of said king pins.

11. The steering system according to claim 9, wherein said fluid pump is a pneumatic pump.

12. The steering system according to claim 9, wherein said fluid pump is a hydraulic pump.

13. The steering system according to claim 9, wherein said vane divides said housing into first and second fluid chambers with said pump pumping said fluid into at least one of said chambers.

14. A method of steering a vehicle comprising the steps of:
   a) providing an electronic steering input;
   b) determining first and second desired Ackerman angles for first and second wheel ends, respectively, in response to the steering input, the first and second desired Ackerman angles differing from one another;
   c) commanding first and second rotational drive units to rotate the first and second wheel ends, respectively; and
   d) rotating the first and second wheel ends to the first and second Ackerman angles, respectively.

15. The method according to claim 14, wherein said rotational drive unit includes a pneumatic pump, and step c) includes actuating said pump.

16. The method according to claim 14, wherein said rotational drive unit includes a hydraulic pump, and step c) includes actuating said pump.

17. The method according to claim 14, wherein said rotational drive unit includes an electric motor, and step c) includes actuating said motor.

* * * * *